(12) United States Patent
Uskert et al.

(10) Patent No.: US 8,439,635 B2
(45) Date of Patent: May 14, 2013

(54) APPARATUS AND METHOD FOR LOCKING A COMPOSITE COMPONENT

(75) Inventors: Richard Christopher Uskert, Carmel, IN (US); Darrell Curtis Harris, Greer, SC (US)

(73) Assignee: Rolls-Royce Corporation, Indianapolis, IN (US)

( * ) Notice: Subject to any disclaimer, the term of this patent is extended or adjusted under 35 U.S.C. 154(b) by 1296 days.

(21) Appl. No.: 12/463,440

(22) Filed: May 11, 2009

(65) Prior Publication Data

US 2010/0284805 A1   Nov. 11, 2010

(51) Int. Cl.
*F04D 29/34* (2006.01)

(52) U.S. Cl.
USPC ...... 415/189; 416/220 R; 416/221; 415/209.3

(58) Field of Classification Search .............. 416/220 R, 416/221, 248; 415/209.2, 209.3, 209.4, 189, 415/190
See application file for complete search history.

(56) References Cited

U.S. PATENT DOCUMENTS

| | | | |
|---|---|---|---|
| 905,487 A | 12/1908 | Worsey | |
| 980,732 A | 1/1911 | Anderson | |
| 1,109,998 A | 9/1914 | Loewenstein | |
| 2,656,146 A | 10/1953 | Sollinger | |
| 2,801,074 A | 7/1957 | Brown | |
| 2,942,842 A * | 6/1960 | Hayes | 416/221 |
| 2,971,744 A | 2/1961 | Szydlowski | |
| 3,057,598 A | 10/1962 | Boyle et al. | |
| 3,076,634 A | 2/1963 | Boyle et al. | |
| 3,395,891 A | 8/1968 | Burge et al. | |
| 3,720,481 A * | 3/1973 | Motta | 416/220 R |
| 3,936,234 A | 2/1976 | Tucker et al. | |
| 3,990,810 A * | 11/1976 | Amos et al. | 415/161 |
| 4,037,990 A | 7/1977 | Harris | |
| 4,208,170 A | 6/1980 | Tucker et al. | |
| 4,221,542 A | 9/1980 | Acres et al. | |
| 4,279,572 A | 7/1981 | Auriemma | |
| 4,343,594 A | 8/1982 | Perry | |
| 4,470,756 A | 9/1984 | Rigo et al. | |
| 4,477,226 A | 10/1984 | Carreno | |
| 4,478,554 A | 10/1984 | Surdi | |
| 4,502,841 A | 3/1985 | Kebedjis | |
| 4,505,640 A | 3/1985 | Hsing et al. | |
| 4,527,952 A | 7/1985 | Forestier et al. | |
| 4,531,889 A | 7/1985 | Grondahl | |
| 4,725,200 A | 2/1988 | Welhoelter | |
| 4,778,342 A | 10/1988 | Conlow | |
| 4,797,065 A | 1/1989 | Conlow | |
| 5,022,824 A | 6/1991 | Violette et al. | |
| 5,123,813 A * | 6/1992 | Przytulski et al. | 416/221 |
| 5,236,309 A * | 8/1993 | Van Heusden et al. | 416/221 |
| 5,318,404 A | 6/1994 | Carreno et al. | |
| 5,399,069 A * | 3/1995 | Marey et al. | 415/209.3 |

(Continued)

*Primary Examiner* — Christopher Verdier
*Assistant Examiner* — Jason Davis
(74) *Attorney, Agent, or Firm* — Krieg DeVault LLP

(57) ABSTRACT

An apparatus and method for locking a composite component such as blade or vane of a turbine engine is disclosed herein. The disclosed lock can also be used generally to fix the position of composite structures. The lock includes a first locking member including a first structure operable to at least partially fix the first locking member along an axis of a slot for receiving a blade or a vane. The lock also includes a second locking member including a second structure operable to engage the blade or vane. The first and second locking members are slidably engaged with one another along mating ramped surfaces.

28 Claims, 7 Drawing Sheets

U.S. PATENT DOCUMENTS

| | | |
|---|---|---|
| 5,727,927 A | 3/1998 | Luxenburger |
| 5,749,706 A | 5/1998 | Maar |
| 5,993,160 A | 11/1999 | Bouchard et al. |
| 6,109,877 A * | 8/2000 | Gekht et al. .................. 416/221 |
| 6,168,382 B1 | 1/2001 | Nolan et al. |
| 6,364,613 B1 | 4/2002 | Deallenbach et al. |
| 6,582,195 B2 | 6/2003 | Davidson |
| 6,739,837 B2 | 5/2004 | Barnette et al. |
| 7,093,359 B2 | 8/2006 | Morrison et al. |
| 7,264,448 B2 | 9/2007 | Garner |

* cited by examiner

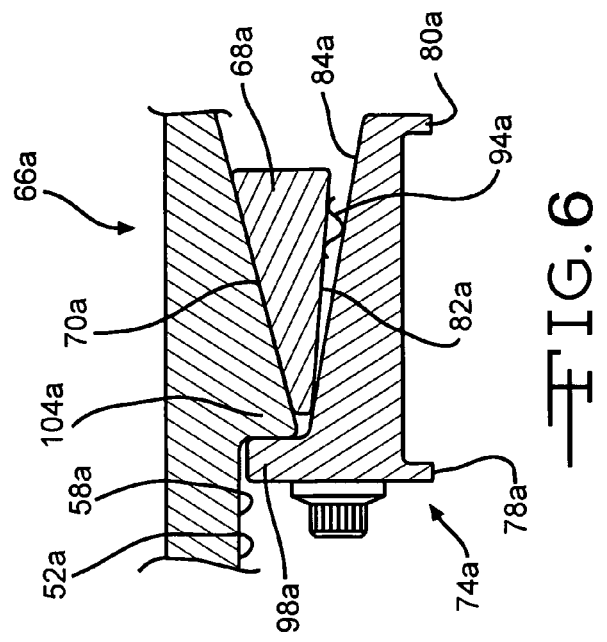
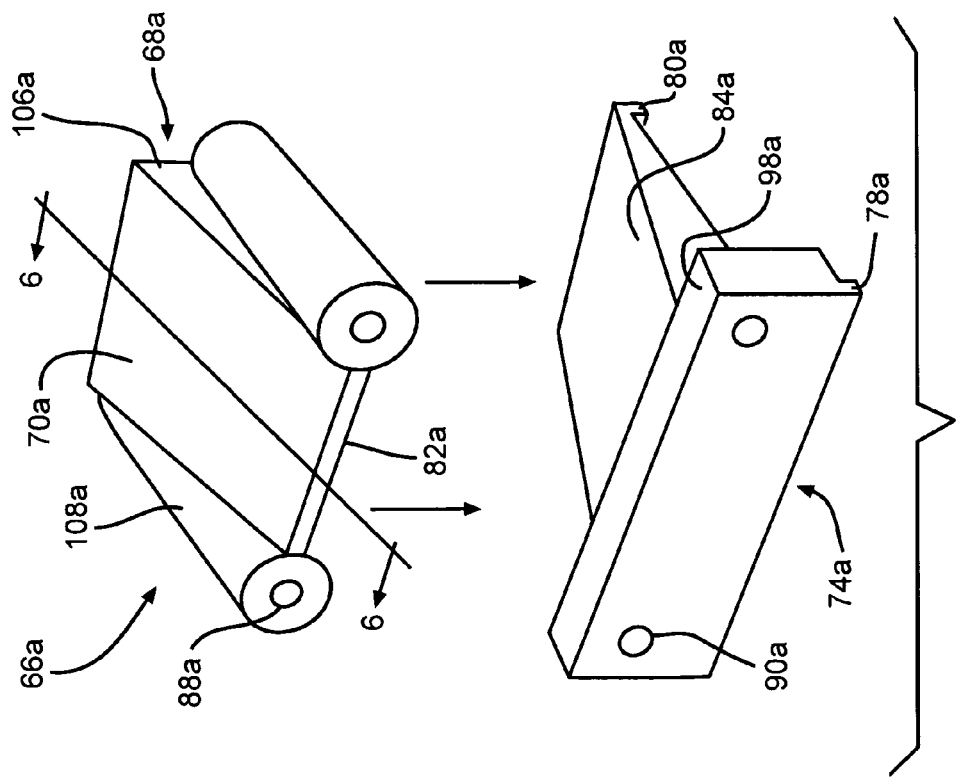
FIG. 6
FIG. 5

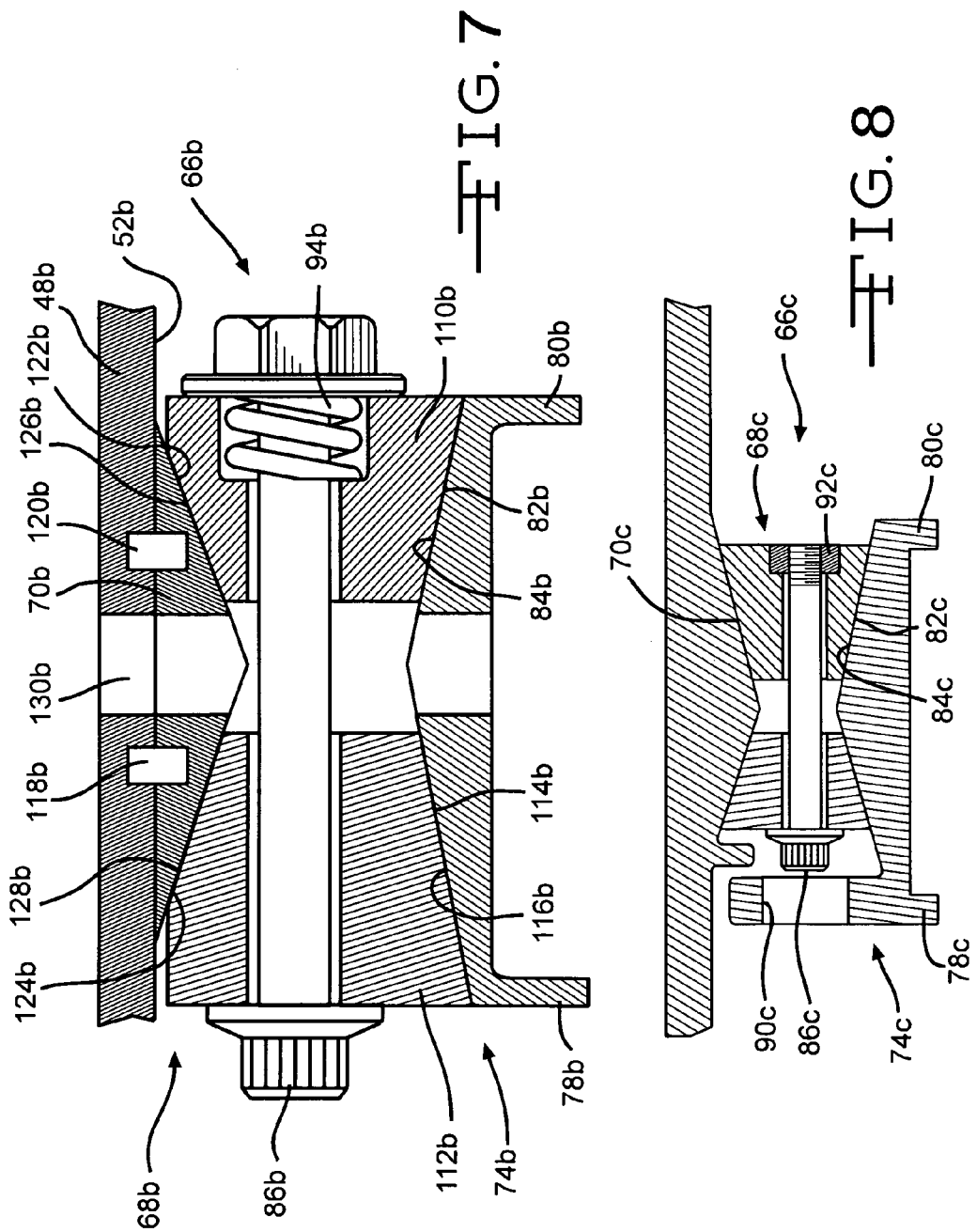

8,439,635 B2

APPARATUS AND METHOD FOR LOCKING A COMPOSITE COMPONENT

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FA8650-07-C-2803 awarded by Department of Defense.

BACKGROUND OF THE INVENTION

1. Field of the Invention

The invention relates to lock for locking a blade, vane, or some other structure of a turbine engine.

2. Description of Related Prior Art

U.S. Pat. No. 3,936,234 discloses a blade locking device for locking radially projecting blades on a rotor. The blade locking device includes a pair of retaining pins having enlarged forward and aft end portions or lugs. The retaining pins are inserted into a radial space between the tang of the blade and the bottom of the rotor slot. Spacer means maintains the retaining pins circumferentially spaced apart and further maintains the end lugs in confronting and overlapping relationship with forward and aft abutment surfaces on the sides of the rotor and with forward and aft end faces on each end of the blade tang. The spacer means is fixed against axial movement relative to the retaining members. Resilient biasing means can be provided to bias the rotor blade radially outward.

SUMMARY OF THE INVENTION

In summary, the invention is an apparatus and method for locking a composite component such as blade or vane of a turbine engine. The disclosed lock can also be used generally to fix the position of composite structures. The lock includes a first locking member including a first structure operable to at least partially fix the first locking member along an axis of a slot for receiving a blade or a vane. The lock also includes a second locking member including a second structure operable to engage the blade or vane. The first and second locking members are slidably engaged with one another along mating ramped surfaces.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is an exploded view of a second exemplary embodiment of the invention;

FIG. 6 is a cross-sectional view taken through section lines 6-6 in FIG. 5 when the structures shown in FIG. 5 are assembled;

FIG. 7 is a cross-sectional view analogous to the views in FIGS. 3 and 6 but of a third exemplary embodiment of the invention;

FIG. 8 is a cross-sectional view analogous to the views in FIGS. 3, 6, and 7 but of a fourth exemplary embodiment of the invention.

DETAILED DESCRIPTION OF THE EXEMPLARY EMBODIMENT

Figure 1:
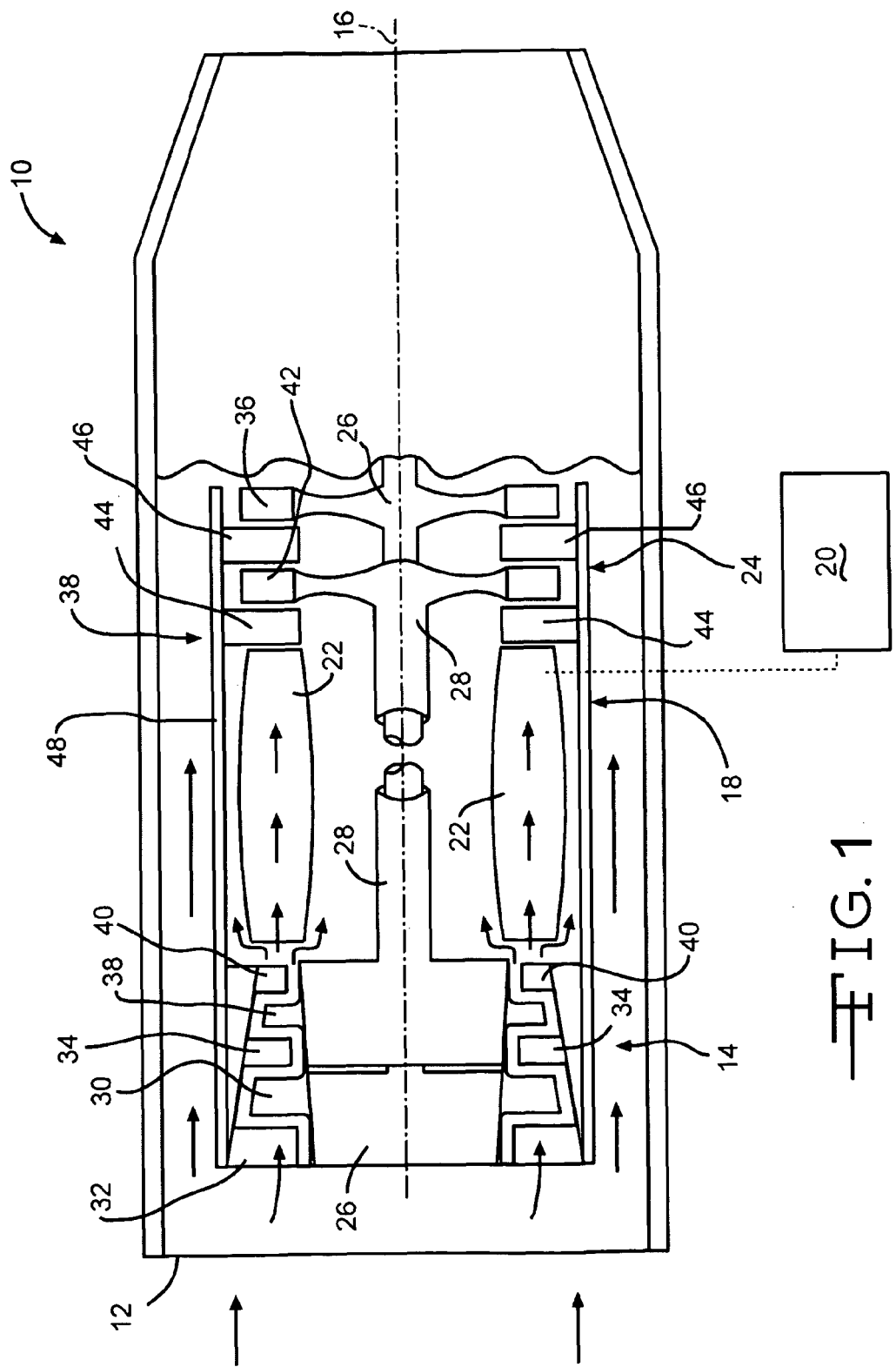
FIG. 1 is a schematic of a turbine engine which incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

It can be desirable to manufacture components as composites of multiple materials. Each material can be chosen for one or more specific mechanical properties. Composites can have a higher strength to weight ratio than metallic components. While composite components can be designed to have sufficient strength in one direction or plane, these structures may exhibit less than desirable strength in another direction or plane. For example, a composite structure can be designed to have sufficient tensile strength, but have relatively low resistance to compressive loading. The composite structure can be crushed when subjected to a compression load, such as when the composite structure is bolted to other structures. Furthermore, forming an aperture in a composite structure for receiving fasteners can weaken the composite structure.

The exemplary embodiment of the present invention can be applied to lock a composite structure in place with minimal compressive loading and without forming fastener-receiving apertures in the composite structure. The exemplary embodiment and the broader invention can be practiced to lock any kind of composite structure. As set forth below, the exemplary embodiment can lock a blade or vane in a turbine engine.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which locking a composite component is desired or required.

The exemplary turbine engine 10 can include an inlet 12 to receive fluid such as air. The turbine engine 10 may include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. A first row or plurality of compressor vanes 32 can be positioned to direct fluid flow to the blades 30 and a second row or plurality of compressor vanes 34 can be positioned to direct fluid flow downstream of the blades 30. The shaft 26 can also support low pressure turbine blades 36 of a low pressure portion of the turbine section 24.

The shaft 28 can encircle the shaft 26. As set forth above, the shafts 26, 28 can be journaled together, wherein bearings are disposed between the shafts 26, 28 to permit relative rotation. The shaft 28 can be a high pressure shaft supporting compressor blades 38 of a high pressure portion of the compressor section 14. A plurality of vanes 40 can be positioned to receive fluid from the blades 34 and direct the fluid into the combustor section 18. The shaft 28 can also support high pressure turbine blades 42 of a high pressure portion of the turbine section 24. A first row or plurality of turbine vanes 44 can be positioned to direct combustion gases over the blades 36. A second row of vanes 46 can be positioned downstream of the blades 42 to direct fluid to the blades 36.

Figure 2:
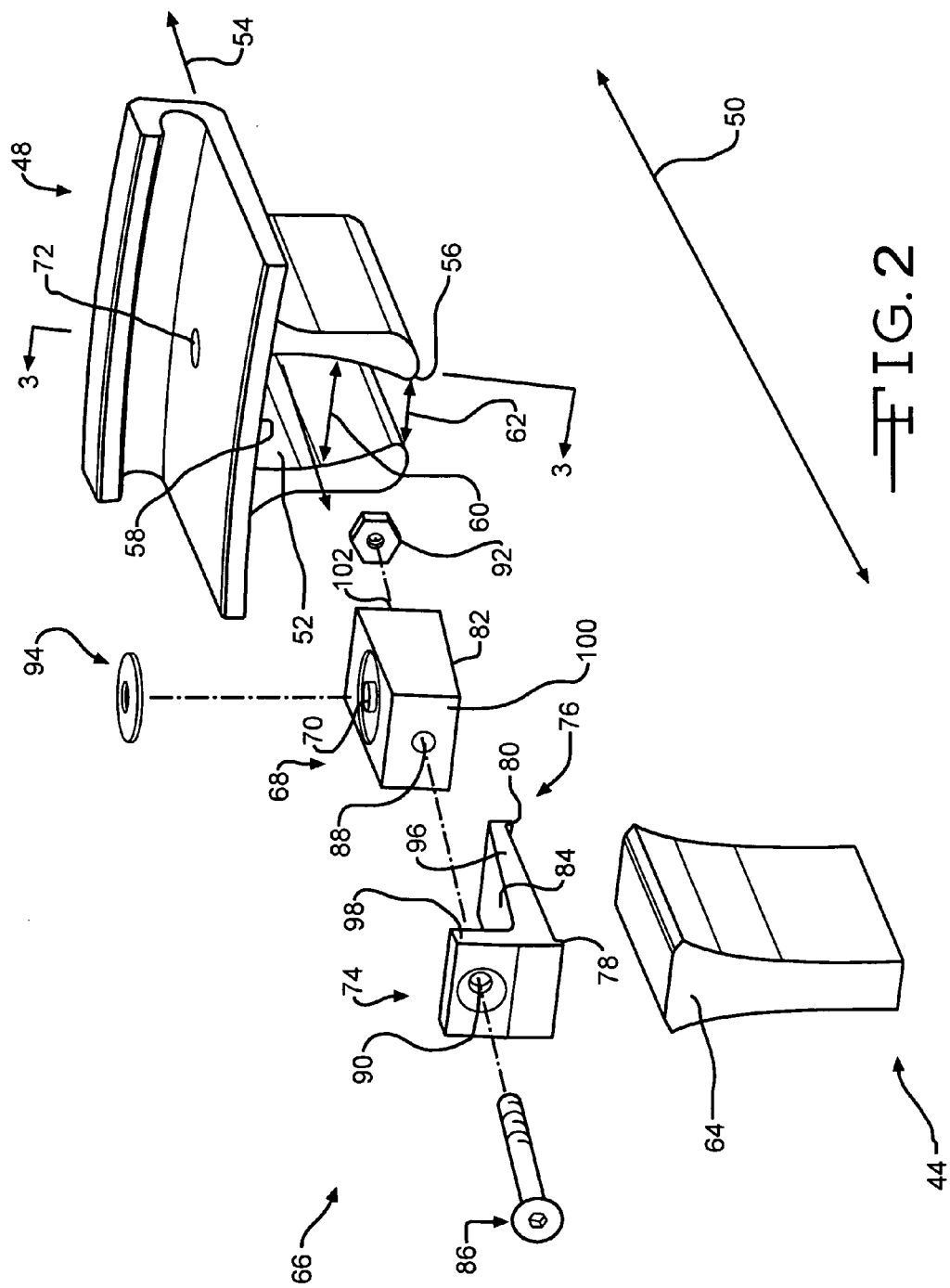
FIG. 2 is an exploded view of a portion of an exemplary turbine engine which incorporates an exemplary embodiment of the invention.
Figure 3:
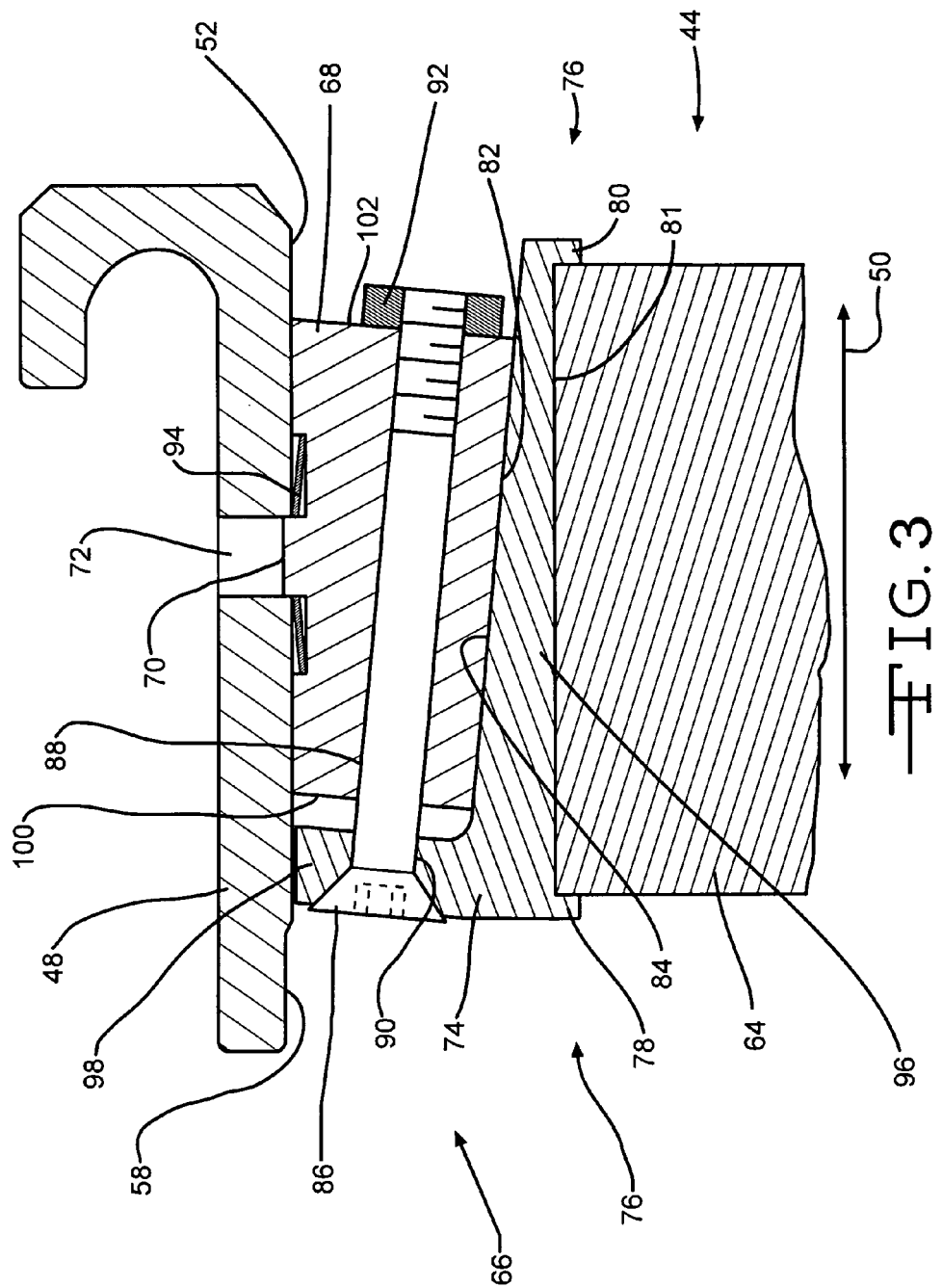
FIG. 3 is a cross-sectional view taken through section lines 3-3 in FIG. 2 when the structures shown in FIG. 2 are assembled.

FIG. 1 shows the vanes 32, 34, 40, 44, 46 mounted to mounting member 48. The arrangement shown in FIG. 1 is schematic; each of the rows of vanes 32, 34, 40, 44, 46 can be supported by a separate mounting member. For example, FIGS. 2 and 3 show views of a specific (non-schematic) and exemplary mounting member 48. The portion of the mounting member 48 shown in FIG. 2 can be a circumferential section of a ring-like mounting member 48. The cross-section shown in FIG. 3 can be the cross-section of the mounting member 48 at each circumferential position about a central axis 50 of the mounting member 48. The axis 50 can be aligned with the centerline axis 16 (shown in FIG. 1) when the mounting member 48 is assembled to the turbine engine 10 (shown in FIG. 1).

Figure 4:
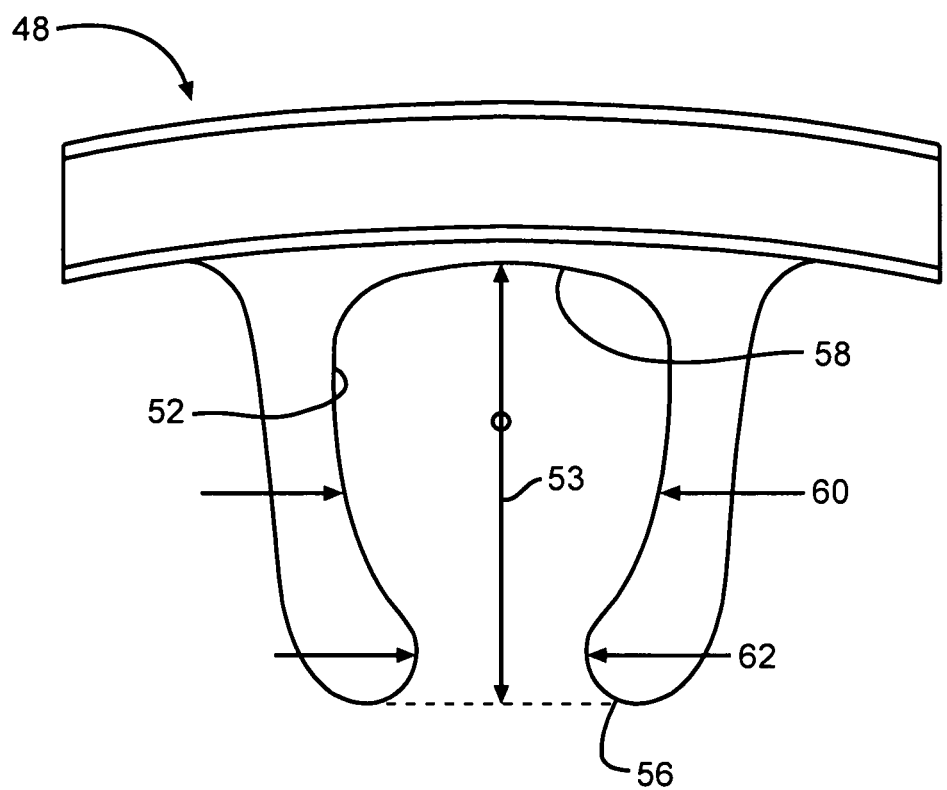
FIG. 4 is a front view of a slot according to an exemplary embodiment of the invention.

The mounting member 48 can be generally static and surround rotating structures in the turbine engine 10 (shown in FIG. 1), such as the shafts 26, 28 (shown in FIG. 1). The mounting member 48 can define a plurality of slots, such as slot 52. Referring now particularly to FIG. 2, the slot 52 can extend along a slot axis 54 parallel to the axis 50. The axes 50 and 54 can be non-parallel in alternative embodiments of the invention. The slot 52 can have a depth defined between a top 56 and a bottom 58 and represented by axis 53 in FIG. 4. At a first depth from the top 56, the slot 52 can define a first width referenced by arrow 60. At a second depth from the top 56, the slot 52 can define a second width referenced by arrow 62. The exemplary first depth is greater than the exemplary second depth and the exemplary first width referenced by arrow 60 can be greater than the exemplary second width referenced by arrow 62. Thus, the slot 62 can be formed to retain the vane 44, such as being shaped as a dovetail or as a tree.

A root portion 64 of the vane 44 can be slidably received in the slot 52. The vane 44 can be a composite member. Co-pending application Ser. No. 12/252,392 discloses composite structures and is hereby incorporated by reference. The root portion 44 can be positioned in the slot 52 at both of the first and second depths (referenced by arrows 60 and 62 respectively). The vane 44 can thus be captured by the slot 52 relative to radial movement toward the axis 50 (or the axis 16 shown in FIG. 1 during operation).

A lock 66 can engage the vane 44 and the mounting member 48 to lock the vane 44 along the slot 52 axis 54. The lock 66 can have a first locking member 68 including a first structure 70 operable to axially fix the first locking member 68 relative to the slot 52. In the exemplary embodiment, the first structure 70 can include at least one projection or post received in an aperture 72 defined in a bottom 58 of the slot 52. The projection or post can be positioned between opposite ends 100, 102 of the first locking member 68. In alternative embodiments of the invention, the first structure 70 can include more than one post or can be shaped differently.

The lock 66 can also include a second locking member 74 having a second structure 76 operable to engage the vane 44. In the exemplary embodiment, the second structure 76 can include first and second tabs 78, 80. The root portion 64 can fit between the tabs 78, 80 without being subjected to a compressive load.

The first and second locking members 68, 74 can be stacked on one another to define a lock height. The lock height can be viewed as the distance, along the slot depth represented by axis 53 in FIG. 4 between a radially inward surface of the second locking member 74 that contacts root portion 64 (such as surface 81 shown in FIG. 3) and radially outermost edge of the first locking member 68 relative to the axis 50. The lock height and the slot depth can be defined in the same direction in this embodiment of the invention. The first and second locking members 68, 74 are slidably engaged with one another along mating ramped surfaces 82, 84 respectively. Movement of the first and second locking members 68, 74 relative to one another changes the height of the lock 66. In operation, the root portion 64 can be received between the tabs 78, 80. Next, the first and second locking members 68, 74 can be engaged by placing the mating ramped surfaces 82, 84 against one another. The first and second locking members 68, 74 can be positioned relatively far apart so the height of the lock 66 is minimized initially. The combined vane 44 and first and second locking members 68, 74 can then be inserted into the slot 52 so that the first structure 70 is aligned with the aperture 72. A threaded fastener 86 can be received in a first threaded aperture 88 defined in the first locking member 68 and in a second threaded aperture 90 defined in the second locking member 74. Aperture 90 may not be threaded, but instead have a clearance such that threaded fastener 86 can pass through and turn freely so as to draw locking member 68 towards and upon locking member 84, forcing root 64 against slot 52 and structure 70 into aperture 72. This arrangement might not allow the two locking members to move away from each other as described below. The exemplary first and second apertures 88, 90 can be centered on an axis extending parallel to the ramped surfaces 82, 84. In alternative embodiments, the first and second apertures 88, 90 could extend parallel to the bottom 58 of the slot 52. The exemplary embodiment of the invention can also include a lock nut 92 defining a third threaded aperture receiving the threaded fastener 86 after the threaded aperture has been received in the first and second threaded apertures 88, 90. The threading-locking structure need not be in a separate part, but can be defined by locking threads internal to one of the first and second locking members 68, 74.

Rotation of the threaded fastener 86 in a first direction can result in the first and second apertures 88, 90 moving closer together. The first locking member 68 can be drawn up the ramp surface 84 and the height of the lock 66 in the slot 52 will increase. The root 64 of the vane 44 can thus be urged against the narrow width of the slot 52. Thus, the lock 66 can generate a radial clamping load on the vane 44 without generating an axial clamping load. The first structure 70 can increasingly penetrate the aperture 72 as the threaded fastener 86 is rotated in the first direction. The vane 44 can be axially locked relative to the slot 52 through the cooperation of the first structure 70 and the aperture 72, the engagement of the first and second locking members 68 and 74 through the fastener 86, and the cooperation between the root portion 64 and the tabs 78 and 80.

Rotation of the threaded fastener 86 in a second direction opposite the first direction can result in the first and second apertures 88, 90 moving further apart. The first locking member 68 can be pushed down the ramp surface 84 and the height of the lock 66 in the slot 52 will decrease. The first structure 70 can be withdrawn from the aperture 72. The vane 44 can thereby be removed from the slot 52.

The exemplary embodiment of the invention can also include a biasing device 94 urging at least one of the first and second locking members 68, 74 in a direction parallel to the depth of the slot 52. In alternative embodiments of the invention, a biasing device could urge one or two locking members in a circumferential direction relative to the axis 50. The exemplary biasing device 94 can be desirable to ensure that vane 44 is urged toward the axis 50 if changes in temperature during operation cause size changes in any of the various components. The biasing device 94 can be a coil spring, a bevel washer, a leaf spring, or any other biasing structure. The exemplary biasing device 94 urges both of the first and second locking members 68, 74 toward the axis 50. In alternative embodiments of the invention, a biasing device could be positioned between the mating ramped surfaces. The exemplary biasing device 94 encircles the first structure 70 to efficiently use the space of afforded by the slot 52.

The structural arrangement of the exemplary lock 66 can isolate the vane 44 from clamping forces. The exemplary second locking member 74 can include a first portion 96 having the ramped surface 84 and the second structure 76 on opposite sides. The exemplary second locking member 74 can also include a second portion 98 extending transverse to the first portion 96. The second aperture 90 is defined in the second portion 98 and is thus not positioned between the first structure 70 and the second structure 76. As a result, clamping loads are not generated in the portion of the second locking member 74 engaging the vane 44. In addition, the first locking member 68 engages the mounting member 48 without imparting a compressive load on the mounting member 48.

The lock 66 can be disposed fully in the slot 52. The exemplary first and second tabs 78, 80 are both positioned in the slot 52 and on opposite axial sides of the vane 44. This feature is not required for practicing the invention, but can be desirable to minimize the space required for holding the vane 44.

Generally, the structures of the exemplary lock 66 are arranged to produce expansion and contraction of the lock 66 along the depth of the slot 52. For example, the first and second locking members 68, 74 are axially adjacent to one another relative to the slot axis 54 and in a direction normal to the slot axis 54. The exemplary lock 66 is thus radially expandable and contractible relative to the axis 50. However, alternative embodiments of the lock 66 can be operable to expand in direction along the width of the slot 52 or oblique to the width of the slot 52.

In the exemplary embodiment, the first structure 70 and the second structure 76 extend normal to one another and the mating ramped surfaces 82, 84 are positioned between the first structure 70 and the second structure 76. However, this arrangement is not required to practice the invention. The mating ramped surfaces 82, 84 can be circumferentially spaced from one or both of the first structure 70 and the second structure 76. Similarly, it is not required of the invention that the ramped surface 82 of the first locking member 68 and the first structure 70 be on opposite sides of the first aperture 88 as arranged in the exemplary embodiment.

The exemplary embodiment of the invention can also be practiced to retain a blade of a turbine engine. Referring again to FIG. 1, one or more of the blades 30, 36, 38, 42 can be held in place with the exemplary lock 66 shown in FIGS. 2 and 3. FIG. 1 is schematic and shows the blades 30, 36, 38, 42 integrally formed with the shafts 26, 28. However, the blades 30, 36, 38, 42 can be formed separately from the shafts 26, 28. Further, the shafts 26, 28 can be formed with shaft portions fixed to separately formed disks and each disk can define a plurality of slots extending along the centerline axis 16. An individual blade 30, 36, 38, 42 can be received in each slot. In such an arrangement, the exemplary lock 66 (shown in FIGS. 2 and 3) can be applied to lock one or more of the blades 30, 36, 38, 42 relative to the slot in which it is received. A disk could be a mounting member in an alternative embodiment of the invention.

FIGS. 5 and 6 show a second exemplary embodiment of the invention. FIG. 5 shows a lock 66a for locking a blade or vane of a turbine engine, such as the vane 44 shown FIG. 2 or a blade or some other composite component. The second exemplary lock 66a includes a first locking member 68a including a first structure 70a operable to at least partially fix the first locking member 68a along an axis of a slot, such as the axis 54 and slot 52 shown in FIG. 2. The second exemplary lock 66a also includes a second locking member 74a having a second structure 78a, 80a operable to engage the blade or vane or other composite structure. The first and second locking members 68a, 74a are stacked together and slidably engaged with one another along mating ramped surfaces 82a, 84a, respectively.

In the second exemplary embodiment of the invention, the first structure 70a can be a surface that partially fixes the first locking member 68a along an axis of a slot. The first structure 70a cooperates with a second portion 98a of the second locking member 74a to fix the first locking member 68a. The slot 52a defines a variable depth and includes a projecting portion 104a extending from a bottom 58a of the slot 52a toward the slot axis (not referenced, analogous to the axis 54 shown in FIG. 2). The first structure 70a and the second portion 98a can engage the projecting portion 104a.

The second exemplary embodiment differs from the first embodiment in several ways, demonstrating that the invention is broader than any one embodiment. For example, the ramped surface 82a of the first locking member 68a and the first structure 70a are not on opposite sides of a first aperture 88a for receiving a fastener, such as the fastener 86 shown in FIGS. 2 and 3. The first aperture 88a is disposed laterally relative to the ramped surface 82a and the first structure 70a. Also, the first aperture 88a is centered on an axis that does not extend parallel to the ramped surface 82a. It is noted that the extent of travel between the first and second locking members 68a, 74a can be relatively small, so that the wedge-like portion 106a of the first locking member 68a and the barrel-like portion 108*a* of the first locking member 68*a* can be fixed together. Thus, relative movement will not prevent a fastener from being received in and rotatable within the apertures 88*a* and 90*a*. Alternatively, the wedge-like portion 106*a* and the barrel-like portion 108*a* could be connected together in manner permitting some relative movement. Also, in the second exemplary embodiment, the biasing device 94*a* can be disposed between the first and second locking members 68*a*, 74*a*.

FIG. 7 shows a third exemplary embodiment of the invention. FIG. 7 shows a lock 66*b* for locking a blade or vane of a turbine engine, such as the vane 44 shown FIG. 2 or a blade or some other composite component. The third exemplary lock 66*b* includes a first locking member 68*b* including a first structure 70*b* operable to at least partially fix the first locking member 68*b* along an axis of a slot, such as the axis 54 and slot 52 shown in FIG. 2. The third exemplary lock 66*b* also includes a second locking member 74*b* having a second structure 78*b*, 80*b* operable to engage the blade or vane or other composite structure. The first and second locking members 68*b*, 74*b* are stacked together and slidably engaged with one another along mating ramped surfaces 82*b*, 84*b*, respectively.

The third embodiment of the invention differs from the previously-described embodiments in several ways, demonstrating that the invention is broader than any one embodiment. The exemplary first locking member 68*b* includes first and second wedge members 110*b*, 112*b* interconnected with one another through a fastener 86*b*. Each of the first and second wedge members 110*b*, 112*b* defines a ramp surface mating with the second locking member 74*b*. The first wedge member 110*b* defines the ramp surface 82*b* and the second wedge member 112*b* defines a ramp surface 114*b*. The second locking member 74*b* defines surfaces to mate with each ramp surface 82*b*, 114*b*, such as the surfaces 84*b* and 116*b*. Also, in the first locking member 68*b*, the first structure 70*b* is separately formed from the structure defining the ramped surface 82*b*, the wedge member 110*b*. The exemplary structure 70*b* can be disposed between the wedge member 110*b* and the mounting member 48*b* as well as between the wedge member 112*b* and the mounting member 48*b*. Pins 118*b* and 120*b* can be received in apertures defined in the mounting member 48*b* and the first structure 70*b* to positively lock the first structure 70 along the slot axis.

When the fastener 86*b* is rotated in a first direction, the wedge members 110*b* and 112*b* can be moved towards one another. The wedge member 110*b* can be drawn up the ramp surface 84*b*, the wedge member 112*b* can be drawn up the ramp surface 116*b*, and the height of the lock 66*b* in the slot 52*b* will increase. The wedge members 110*b* and 112*b* can also ride along ramped surfaces 122*b*, 124*b* defined by the first structure 70*b* via ramped surfaces 126*b* and 128*b*, respectively. Rotation of the fastener 86*b* in a second direction opposite the first direction can result in the wedge members 110*b* and 112*b* being moved away from one another.

The third exemplary embodiment can also include a biasing device 94*b* mounted internally of the first locking member 68*b*. The third exemplary embodiment can also include a passageway 130*b* extending through the mounting member 48*b*, the first locking member 68*b*, and the second locking member 74*a*. Cooling fluid can be directed through the passageway 130*b* to cool the vane or blade or other composite structure.

FIG. 8 shows a fourth exemplary embodiment of the invention. FIG. 8 shows a lock 66*c* for locking a blade or vane of a turbine engine, such as the vane 44 shown FIG. 2 or a blade or some other composite component. The fourth exemplary lock 66*c* includes a first locking member 68*c* including a first structure 70*c* operable to at least partially fix the first locking member 68*c* along an axis of a slot, such as the axis 54 and slot 52 shown in FIG. 2. The fourth exemplary lock 66*c* also includes a second locking member 74*c* having a second structure 78*c*, 80*c* operable to engage the blade or vane or other composite structure. The first and second locking members 68*c*, 74*c* are stacked together and slidably engaged with one another along mating ramped surfaces 82*c*, 84*c*, respectively.

The fourth embodiment of the invention differs from the previously-described embodiments, demonstrating that the invention is broader than any one embodiment. The fourth exemplary lock 66*c* includes a lock nut 92*c* internal to the first locking member 68*c*. The fourth exemplary lock 66*c* also includes an unthreaded aperture 90*c* allowing access to the fastener 86*c*.

Figure 9:
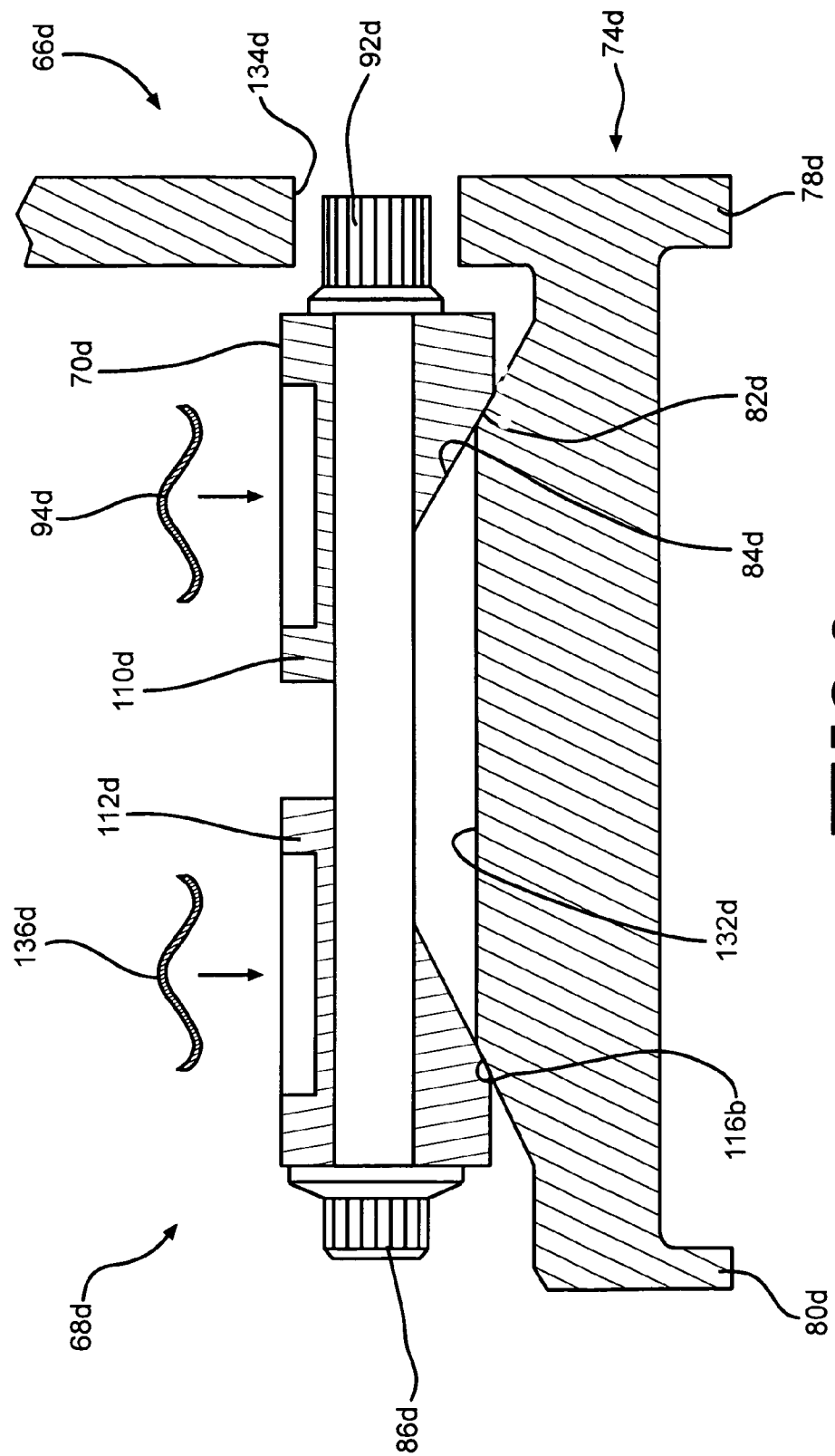
FIG. 9 is a cross-sectional view analogous to the views in FIGS. 3 and 6-8 but of a fifth exemplary embodiment of the invention.

FIG. 9 shows a fifth exemplary embodiment of the invention. FIG. 9 shows a lock 66*d* for locking a blade or vane of a turbine engine, such as the vane 44 shown FIG. 2 or a blade or some other composite component. The fifth exemplary lock 66*d* includes a first locking member 68*d* including a first structure 70*d* operable to at least partially fix the first locking member 68*d* along an axis of a slot, such as the axis 54 and slot 52 shown in FIG. 2. The fifth exemplary lock 66*d* also includes a second locking member 74*d* having a second structure 78*d*, 80*d* operable to engage the blade or vane or other composite structure. The first and second locking members 68*d*, 74*d* are stacked together and slidably engaged with one another along mating ramped surfaces 82*d*, 84*d*, respectively.

The fifth embodiment of the invention differs from the previously-described embodiments in several ways, demonstrating that the invention is broader than any one embodiment. The first structure 70*d* can be a flat surface that fixes the first locking member 68*d* through frictional interaction, rather than a positive locking interaction, with a flat surface defined by the mounting member (not shown). The second locking member 74*d* defines an oversized slot 132*d* extending between ramp surfaces 84*d* and 116*d* to accommodate movement of the fastening member 86*d* when the height of the lock 66*d* is changed. The second locking member 74*d* also defines an oversized aperture 134*d* to accommodate movement of the lock nut 92*d* when the height of the lock 66*d* is changed. The fifth embodiment of the invention also includes two biasing devices 94*d*, 134*d*, one for each wedge member 110*d* and 112*d*.

It is further noted that the exemplary lock can be practiced to mount a composite structure in a turbine engine other than a blade or a vane. It is further noted that the second structure shown in the exemplary embodiments are tabs on opposite sides of the second locking member. In alternative embodiments, other forms of structure can be applied. For example, the radially inward surface of the second locking member and the radially outer surface of the root portion can define non-flat surfaces that mesh with one another. Or a projection may extend from one of these surfaces and be received in a recess or aperture defined in the other of the surfaces.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The right to claim elements and/or sub-combinations of the combinations disclosed herein is hereby reserved.

What is claimed is:

1. A lock for locking a blade or vane of a turbine engine and comprising:
 a first locking member including a first structure engaged with a mounting member defining a slot for receiving a blade or a vane to at least partially fix said first locking member along an axis of the slot; and
 a second locking member including a second structure operable to engage the blade or vane, wherein said first and second locking members are stacked together and slidably engaged with one another along mating ramped surfaces.

2. The lock of claim 1 further comprising:
 a fastener received in a first aperture defined in said first locking member, wherein said stacked first and second locking members define a lock height and rotation of said fastener in a first direction results in an increase of said height and rotation of said fastener in a second direction opposite the first direction results in a decrease of said height.

3. The lock of claim 2 wherein said first locking member further comprises:
 first and second wedge members interconnected with one another through said fastener, wherein each of said first and second wedge members defines a ramp surface mating with said second locking member.

4. The lock of claim 2 wherein said ramped surface of said first locking member and said first structure are on opposite sides of said first aperture.

5. The lock of claim 2 wherein said first aperture is centered on an axis extending parallel to said ramped surface of said first locking member.

6. The lock of claim 2 further comprising:
 a lock nut defining a third aperture receiving said fastener after said fastener has been received in said first aperture.

7. The lock of claim 1 wherein said second structure is further defined as being operable to engage the blade or vane without imparting a compressive load on the blade or vane.

8. The lock of claim 1 wherein said stacked first and second locking members define a lock height and wherein said first structure is further defined as at least one projection extending along said lock height and positioned between opposite axial ends of said first locking member.

9. The lock of claim 1 wherein said first structure and said second structure extend normal to one another and said mating ramped surfaces are positioned between said first structure and said second structure.

10. The lock of claim 1 wherein said first structure of said first locking member is engaged in contact with said mounting member to at least partially fix said first locking member in an axial direction relative to said mounting member.

11. The lock of claim 10 wherein said first locking member includes a first side and an opposite second side, said first side engaged in contact with said mounting member, said second side defining a first of said mating ramped surfaces engaged with a second of said mating ramped surfaces defined by said second locking member.

12. The lock of claim 1 wherein one of said first structure and said mounting member defines a projection engaged with an adjacent portion of the other of said first structure and said mounting member to at least partially fix said first locking member in an axial direction relative to said mounting member.

13. The lock of claim 12 wherein said projection is engaged within an aperture defined by the other of said first structure and said mounting member to positively lock said first locking member to said mounting member in said axial direction.

14. A lock for locking a blade or vane of a turbine engine and comprising:
 a first locking member including a first structure operable to at least partially fix said first locking member along an axis of a slot for receiving a blade or a vane; and
 a second locking member including a second structure operable to engage the blade or vane, wherein said first and second locking members are stacked together and slidably engaged with one another along mating ramped surfaces; and
 a fastener received in a first aperture defined in said first locking member, wherein said stacked first and second locking members define a lock height and rotation of said fastener in a first direction results in an increase of said height and rotation of said fastener in a second direction opposite the first direction results in a decrease of said height, wherein said fastener is further defined as being received in a second aperture defined in said second locking member.

15. The lock of claim 14 wherein said second locking member further comprises:
 a first portion wherein said ramped surface of said second locking member and said second structure are on opposite sides of said first portion; and
 a second portion extending transverse to said first portion, wherein said second aperture is defined in said second portion.

16. A turbine engine comprising:
 a mounting member defining a slot extending along a slot axis and having a first width at a first depth and a second width at a second depth wherein said first width is greater than said second width and said first depth is greater than said second depth;
 a composite member having a root positioned in said slot at both of said first and second depths; and
 a lock for locking said composite member along said slot axis, said lock having a first locking member including a first structure engaged with said mounting member and operable to at least partially fix said first locking member relative to said mounting member and a second locking member including a second structure engaged with said composite member and operable to axially fix said second locking member relative to said composite member, wherein said first and second locking members are slidably engaged with one another along mating ramped surfaces.

17. The turbine engine of claim 16 wherein said mounting member is further defined as a static hanger and said composite member is further defined as a vane.

18. The turbine engine of claim 16 wherein said first and second locking members are adjacent to one another along said slot axis and in a direction normal to said slot axis.

19. The turbine engine of claim 16 further comprising:
 a biasing device urging at least one of said first and second locking members in a direction normal to said slot axis.

20. The turbine engine of claim 19 wherein said biasing device urges both of said first and second locking members in a direction normal to said slot axis.

21. The turbine engine of claim 19 wherein said biasing device encircles said first structure.

22. The turbine engine of claim 16 wherein said second structure includes first and second tabs fully positioned in said slot and on opposite axial sides of said composite member.

23. The turbine engine of claim 16 wherein said slot defines a variable depth including a projecting portion extending from a bottom of said slot toward said slot axis and wherein said first locking member engages said projecting portion.

24. The turbine engine of claim 16 wherein said first structure of said first locking member is engaged in contact with said mounting member to at least partially fix said first locking member in an axial direction relative to said mounting member.

25. The turbine engine of claim 24 wherein said first locking member includes a first side and an opposite second side, said first side engaged in contact with said mounting member, said second side defining a first of said mating ramped surfaces engaged with a second of said mating ramped surfaces defined by said second locking member.

26. The turbine engine of claim 16 wherein one of said first structure and said mounting member defines a projection engaged with an adjacent portion of the other of said first structure and said mounting member to at least partially fix said first locking member in an axial direction relative to said mounting member.

27. The turbine engine of claim 26 wherein said projection is engaged within an aperture defined by the other of said first structure and said mounting member to positively lock said first locking member to said mounting member in said axial direction.

28. A turbine engine comprising:
- a mounting member defining a slot extending along a slot axis and having a first width at a first depth and a second width at a second depth wherein said first width is greater than said second width and said first depth is greater than said second depth;
- a composite member having a root positioned in said slot at both of said first and second depths; and
- a lock for locking said composite member along said slot axis, said lock having a first locking member including a first structure operable to at least partially fix said first locking member relative to said mounting member and a second locking member including a second structure operable to axially fix said second locking member relative to said composite member, wherein said first and second locking members are slidably engaged with one another along mating ramped surfaces;
- wherein said first structure positively locks said first locking member with said mounting member.

* * * * *